United States Patent [19]
Wojciechowski

[11] Patent Number: 5,636,749
[45] Date of Patent: Jun. 10, 1997

[54] UNDULATING SCREEN FOR VIBRATORY SCREENING MACHINE

[75] Inventor: Keith F. Wojciechowski, Lakeview, N.Y.

[73] Assignee: Derrick Manufacturing Corporation, Buffalo, N.Y.

[21] Appl. No.: 443,856

[22] Filed: May 18, 1995

[51] Int. Cl.$^6$ .............................. B07B 1/49; B01D 33/00
[52] U.S. Cl. ........................... 209/403; 209/399; 210/389; 210/490; 210/493.1; 210/499
[58] Field of Search ..................... 209/329, 330, 209/397, 398, 399, 401, 402, 403; 210/388, 389, 489, 490, 493.1, 498, 499; 156/210, 308.2, 309.6

[56] References Cited

U.S. PATENT DOCUMENTS

| | | | |
|---|---|---|---|
| 5,417,793 | 5/1995 | Bakula | 209/399 X |
| 5,417,858 | 5/1995 | Derrick et al. | 209/403 X |
| 5,417,859 | 5/1995 | Bakula | 210/388 |

FOREIGN PATENT DOCUMENTS

| | | | |
|---|---|---|---|
| 599661 | 6/1960 | Canada | 210/493.1 |

*Primary Examiner*—William E. Terrell
*Assistant Examiner*—Tuan Nguyen
*Attorney, Agent, or Firm*—Joseph P. Gastel

[57] ABSTRACT

A screening screen assembly for a vibratory screening machine includes a substantially planar apertured plate and an undulating subassembly of a support screen and a fine screening screen having ridges and troughs. A fused plastic grid bonds the fine screening screen to the support screen at spaced locations while leaving unobstructed portions of the screens therebetween. The undersides on the troughs are bonded to the apertured plate. The fused plastic grid includes first portions extending substantially perpendicularly to the length dimension of the ridges and throughout the major portion of the sides of the ridges and also includes second portions which extend transversely of the first portions and extend through spaced portions of the troughs while leaving unobstructed portions of the troughs therebetween.

8 Claims, 2 Drawing Sheets

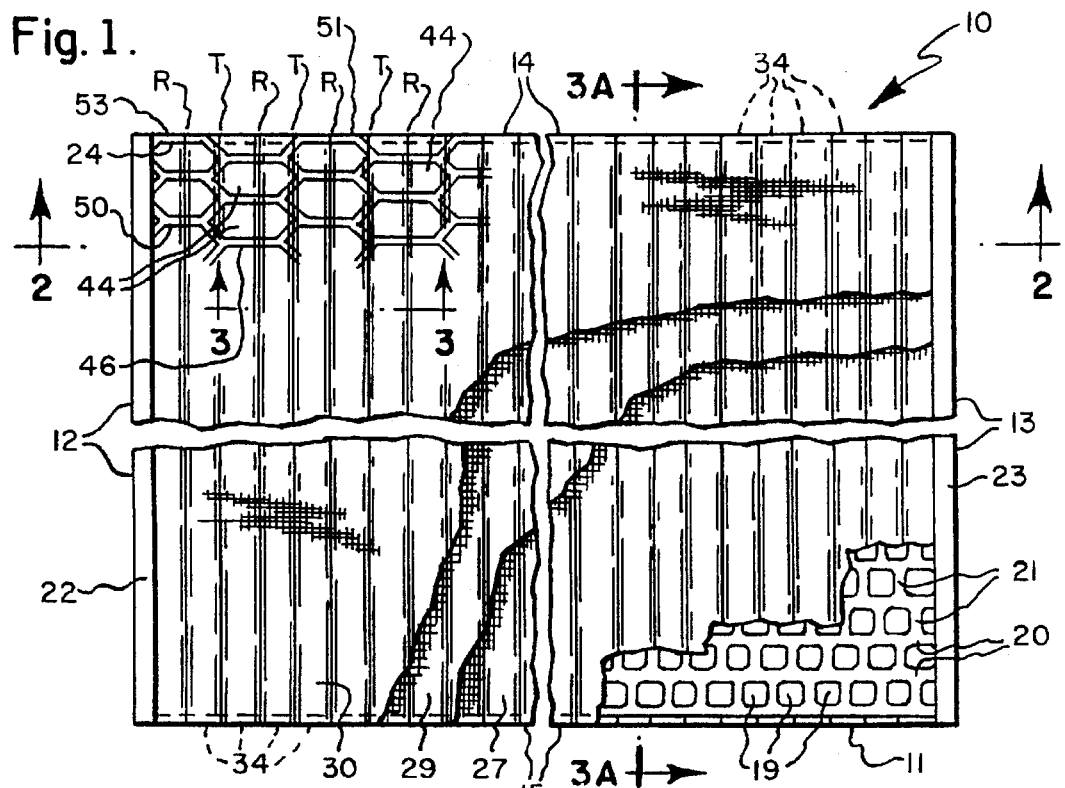

5,636,749

1

UNDULATING SCREEN FOR VIBRATORY SCREENING MACHINE

BACKGROUND OF THE INVENTION

The present invention relates to an improved vibratory screen assembly for a vibratory screening machine, and more specifically to a vibratory screen assembly wherein a screen subassembly consisting of a plurality of screens of different mesh size are bonded to each other in an undulating shape without wrinkles by a fused plastic grid.

In copending patent application Ser. No. 08/273,217, filed Jul. 11, 1994, now U.S. Pat. No. 5,417,859, various embodiments of vibratory screen assemblies are disclosed, each having a multi-screen undulating subassembly bonded to a perforated plate. Certain of the multi-screen undulating screen subassemblies comprise a plurality of screens of different mesh size bonded by a fused plastic grid. In copending application Ser. No. 08/443,377, filed May 17, 1996, which is a continuation of the aforementioned patent application Ser. No. 08/273,217, claims are presented to the configuration of certain embodiments of fused plastic grids which bond the plurality of screens in such a manner which does not produce wrinkles. The vibratory screen assembly of the present invention is an improvement over the subject matter of the foregoing applications.

SUMMARY OF THE INVENTION

It is one object of the present invention to provide an improved vibratory screen assembly wherein a multi-layer undulating screen is constructed in such a manner that one or more fine screens which are bonded to a coarse screen by a fused plastic grid will lie smoothly against the latter without wrinkles.

Another object of the present invention is to provide an improved screen assembly for a vibratory screening machine in which a plurality of screens which are bonded to each other by a fused plastic grid in an undulating configuration of ridges and troughs not only does not have wrinkles but also does not allow accumulation of material in the troughs.

A further object of the present invention is to provide an improved vibratory screen assembly having a multiple layer undulating screen subassembly of a fine screen bonded to a coarse screen which is conducive to relatively long life in that the fine screen does not have wrinkles which are subject to tearing due to flexing and abrasion when subjected to high G forces in operation. Other objects and attendant advantages of the present invention will readily be perceived hereafter.

The present invention relates to a screening screen assembly for a vibratory screening machine comprising an apertured frame, an undulating subassembly of a support screen and a fine screening screen having ridges and troughs, a fused plastic grid bonding said fine screening screen to said support screen at spaced locations while leaving unobstructed portions of said screens therebetween, undersides on said troughs bonded to said apertured frame, said fused plastic grid including first portions extending substantially perpendicularly to the length dimension of said ridges and throughout the major portion of said sides of said ridges, and said fused plastic grid also including second portions which extend transversely of said first portions and extend through spaced portions of said troughs while leaving unobstructed portions of said troughs therebetween.

The various aspects of the present invention will be more fully understood when the following portions of the speci-

2 fication are read in conjunction with the accompanying drawings wherein:

BRIEF DESCRIPTION OF THE DRAWINGS

FIG. 1 is a fragmentary plan view of one embodiment of the improved screen assembly of the present invention with portions broken away to show various layers thereof;

FIG. 2 is a fragmentary enlarged cross sectional view taken substantially along line 2—2 of FIG. 1 and showing primarily the construction at the ends of the screen supporting plate for securing the vibratory screen in a vibratory screening machine;

FIG. 3 is a fragmentary cross sectional view taken substantially along line 3—3 of FIG. 1;

FIG. 3A is a fragmentary cross sectional view taken substantially along line 3A—3A of FIG. 1 and showing the seals at the ends of the ridges;

FIG. 4 is a fragmentary plan view of the undulating screen subassembly containing one type of fused plastic grid disclosed in U.S. Pat. No. 5,417,859;

Summarizing briefly in advance, the improved multi-layer undulating screen construction is fabricated in such a configuration that it does not have wrinkles and is thus conducive to a longer life.

DESCRIPTION OF THE PREFERRED EMBODIMENTS

Figure 6:
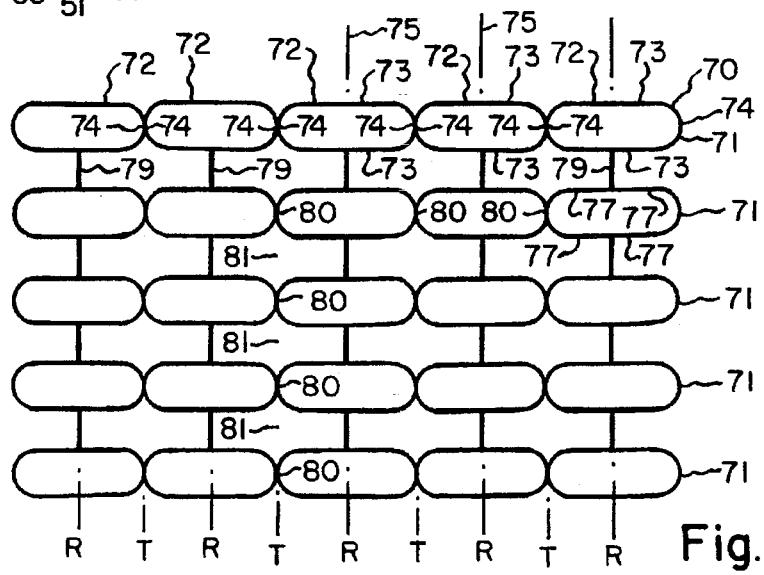
FIG. 6 is a schematic plan view of another plastic grid configuration in accordance with the principles of the present invention.
Figure 7:
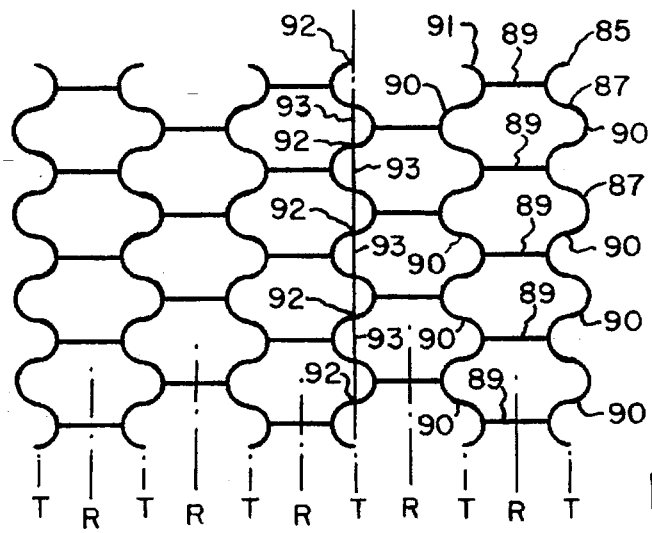
FIG. 7 is a schematic plan view of still another plastic grid configuration in accordance with the principles of the present invention.

One embodiment of the improved screen assembly 10 is shown in FIGS. 1-3, and alternate configurations of plastic grids are shown in FIGS. 6 and 7.

The improved screen assembly 10 of FIGS. 1-3 includes a frame in the form of a perforated metal plate 11, such as steel or any other suitable metal, having a first pair of opposite edges 12 and 13 and a second pair of opposite edges 14 and 15 and an upper surface 16 and a lower surface 17. Plate 11 includes apertures 19 which are bordered by elongated metal strip-like portions or members 20 which extend between edges 12 and 13 and by shorter strip-like portions 21 which extend lengthwise between elongated strip-like portions 20. The openings 19 are formed by a punching operation and are quadrangles of approximately 1 inch square with rounded corners but they may be of any other desired shape or size. Strip-like portions 20 and 21 are approximately 1/10 of an inch wide, but they may be of any desired width. The length of plate 11 between edges 12 and 13 may be approximately 3½ feet and its width between edges 14 and 15 may be approximately 2½ feet, and it may have a thickness of about 1/16 of an inch. However, it will be appreciated that the size of plate 11 may vary as required to fit different machines. The width of each opening 19 is a small fraction of the length of the plate between edges 12 and 13. The same is true of the relationship between the height of openings 19 and the width of the plate between edges 14 and 15. Channel-shaped members 22 and 23 are mirror image counterparts and are constructed as shown in FIG. 2. More specifically, extensions 18 and 18' of plate 11 are folded into channel-shaped configurations. Sheet metal member 26 and 26', which are known as binders, are bent to the shape shown in FIG. 2 and they bracket the edges 12 and 13 in the manner depicted in FIG. 2. The foregoing description of plate 11 is also essentially set forth in U.S. Pat. No. 4,575,421. As will be apparent hereafter, any suitable plate or any suitable frame which provides the frame portions or members to which a screen can be attached may be utilized, and this may include a frame made of hollow rods or solid bars, and a frame of this type is disclosed in U.S. Pat. No. 5,417,858.

The main feature of the embodiment of FIGS. 1–3 is that the plurality of screens which are in an undulating shape of ridges and troughs and which are secured to plate 11 are bonded together into a subassembly by a perforated plastic grid 24 which has a specialized configuration and which has been fused into the screens 27, 29 and 30 by suitable heat and pressure in a specific orientation relative to the ridges and troughs. The screen subassembly 25 includes a coarse screen 27 which serves a supporting function and may have a size of between 6 mesh and 20 mesh or any other suitable size. A fine screening screen 29 is bonded to coarse supporting screen 27 and it may have a mesh size of between 30 mesh and 325 mesh, or any other suitable size. A finer screening screen 30 is bonded to fine screening screen 29 and it may have a mesh size of between 40 mesh and 400 mesh, or any other suitable size. Preferably the intermediate fine screen 29 should be two U.S. sieve sizes coarser than the finer uppermost screen 30. The three screens 27, 29 and 30 are bonded to each other by a fused plastic grid 24 which permeates all three screens. The screen subassembly 25 is formed in undulating curved shape, as depicted in FIGS. 2 and 3, and it has ridges 31 and troughs 32. The undersides of troughs 32 at 33 are bonded to plate 11 by a suitable adhesive such as epoxy. This bonding at 33 occurs at all areas where the undersides of the troughs 32 contact strips 20 and 21. The open ends of the ridges 31 are sealed or blocked by polyurethane caps 34 (FIG. 3A) which are molded into place as fully described in said U.S. Pat. No. 5,417,859, which is incorporated herein by reference.

The screen subassembly 25 consisting of bonded screens 27, 29 and 30 is formed in accordance with the method fully described in U.S. Pat. No. 5,417,859, which as noted above is incorporated herein by reference. Briefly, and by way of summary, screens 27, 29 and 30 and the plastic grid 24 are superimposed in contiguous abutting relationship, and suitable heat and pressure are applied to bond the foregoing parts into a unitary configuration wherein the plastic grid 24 fuses in a precisely controlled pattern and permeates the three screens 27, 29 and 30 and bonds them together, as can be seen from FIGS. 1 and 3.

Figure 5:
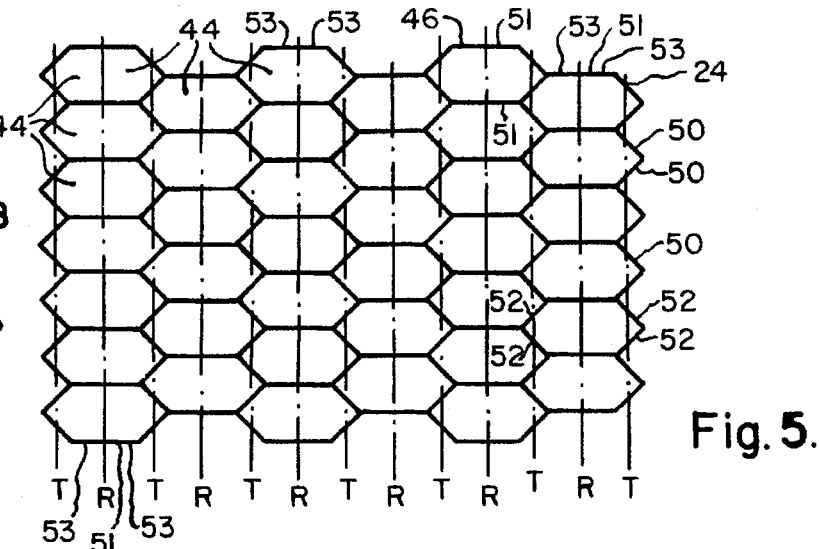
FIG. 5 is a schematic view of the plastic grid configuration of FIG. 1.

The plastic grid 24 provides a gridwork within the screen assembly 25 wherein there are openings 44 (FIGS. 1 and 5) between the plastic portion 46 of the grid 24. A fragmentary plan view of the plastic grid 24 is shown in FIGS. 1 and 5. The plastic grid 24 is preferably made of polyethylene, and in this instance it was approximately 0.062 inches thick, that is, before it was fused by heat and pressure into bonding relationship with screens 27, 29 and 30. The bonding was effected by pressing the superimposed abutting screens 27, 29 and 30 and plastic grid 24 with a heated platen. The temperature of the platen was approximately 450° F. and it was applied at a pressure of 12 psi for approximately two minutes. The main consideration was that the polyethylene grid 24 should be fused to a sufficient degree so that it will permeate the openings in screens 27, 29 and 30 and bond them together. It will be appreciated that any other suitable plastic, such as polypropylene, which is heat-fusible may be used. It will also be appreciated that the bonding temperatures, pressures, and times of pressing will vary with the plastic, its thickness, the types of screens being bonded, and other factors. The foregoing is described in U.S. Pat. No. 5,417,859.

After the screens were bonded to each other and they formed a planar laminate as shown in FIG. 8A, they were formed into the undulating shape shown in FIG. 3 by a suitable die arrangement as described in U.S. Pat. No. 5,417,859, which, as noted above, is incorporated herein by reference.

As noted in U.S. Pat. No. 5,417,859, plastic grids have been used in the past to bond screening screens together which were utilized in vibratory screening machines in a flat condition rather than in an undulating shape. Flat plastic bonded screens of this prior type did not function successfully in operation because the fused plastic grid permitted the screens to stretch when subjected to the high G forces encountered in operation. The reason that they stretched was that the entire width of the flat screens between their edges were unsupported. In contrast to the foregoing, the unsupported spans in the corrugated screen of the present invention is between troughs 32, and the stretching of the fused plastic is not a factor which adversely affects the operation. In fact, it is beneficial because it provides limited amounts of yieldability, as discussed above.

The contacting portions of the screen subassembly 25 and plate 11 are bonded to each other by epoxy, as mentioned above. As described in U.S. Pat. No. 5,417,859, this bonding is effected by dipping a heated perforated plate 11 into a fluidized powdered epoxy bed so that the powdered epoxy adheres to the plate. The plate with a layer of powdered epoxy thereon is then cooled. Thereafter, it is reheated to 350° F., and a suitable press (not shown) is used to hold the undersides of the troughs of the screen subassembly 25 in engagement with plate 11 for approximately three minutes and the epoxy will fuse into the undersides of the troughs of the screens. After the epoxy cools, the undulating screen will be bonded to the plate. The foregoing broad technique of bonding by the use of powdered epoxy is conventional in the art. if desired, the screen subassembly can be adhesively secured to plate 11 by the use of liquid epoxy which is applied to the upper surface of the plate. It will be appreciated that any other suitable method of bonding the screen subassembly to the plate may be used.

After the undulating screen subassembly 25 has been bonded to plate 11, the open ends of the ridges 31 are sealed by caps 34 as fully described in U.S. Pat. No. 5,417,859. It will be appreciated that caps 34 permeate the screen subassembly 25 and also provide a seal with the edge portions 162 and 163 (FIG. 3A) of edges 14 and 15, respectively. As an alternate, liquid epoxy can be used to produce caps 34. Also, the ends of the ridges may be blocked by any other suitable method which may include but are not limited to those shown in copending patent application Ser. No. 08/062,464, now U.S. Pat. No. 5,417,858, which is incorporated herein by reference.

In accordance with one embodiment of the present invention, the plastic grid 24 (FIGS. 1 and 5) is in the form of hexagonal polygons 50 each having elongated sides 51 and shorter sides 52. The longer sides 51 extend substantially perpendicularly across the peaks of the ridges 31 which are designated R and the shorter sides 52 criss-cross across the troughs 32, which are designated T. The portions 53 of elongated sides 51 extend downwardly along the major portions of the sides 54 of the ridges 31. The short sides 52 of the hexagonal polygons 50 criss-cross across troughs 32 to thereby provide open spaces in the troughs 32 between polygonal sides 52 which are unobstructed so that puddles of material being screened will not form along the troughs. It can thus be seen that each hexagonal polygonal configuration of the grid 24 has halves which are substantially symmetrical about the peaks R of the ridges 31 and which extend substantially perpendicularly to the peaks and downwardly along major portions of the sides 54 of the ridges 31.

Figure 4A:
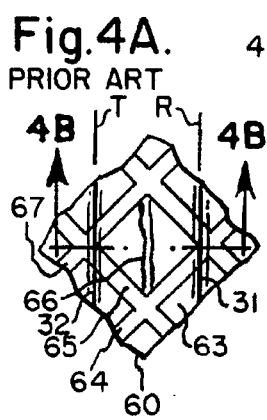
FIG. 4A is a fragmentary plan view of a portion of FIG. 4.
Figure 4B:
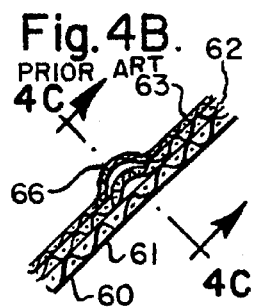
FIG. 4B is a fragmentary cross-sectional view taken substantially along line 4B—4B of FIG. 4A.
Figure 4C:
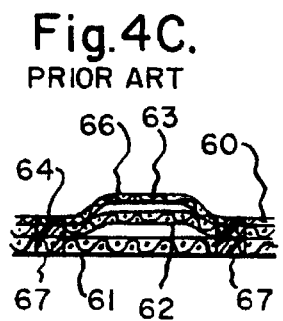
FIG. 4C is a fragmentary cross-sectional view taken substantially along line 4C—4C of FIG. 4B.

In FIG. 4 a prior construction is shown wherein an undulating multi-layered screen 60 is shown which has a coarse screen 61, a fine screen 62 and a finer screen 63 bonded to each other by a fused plastic grid 64. The multi-layer undulating screen 60 is bonded to a perforated plate (not shown) such as 11. As can be seen from FIG. 4, the polygonal shapes 65 of the fused plastic grids are not symmetrical to the peaks R of the ridges 31, nor do the sides of these polygonal shapes extend substantially perpendicularly to the peaks R of the ridges. This is conducive to the formation of wrinkles 66 which usually occur substantially parallel to the peaks R of the ridges and between relatively wide expanses of screen between the strips of the polygonal shapes. These wrinkles usually consist of elevated portions of the two upper screening screens as can be seen from FIGS. 4B and 4C. However, the wrinkle can also occur only in the uppermost screen. It will be appreciated that the wrinkles 66 exist primarily along the widest spacings between the fused plastic strips 67, but they can occur at other areas also. In any event, grid configurations which do not have the characteristics of the symmetrical grid configuration such as 24 are prone to having wrinkles at various spaced portions on either the uppermost screen or on both upper screens.

In FIG. 6 another embodiment of a plastic grid 70 is disclosed. In this embodiment there are rows 71 of ellipse-like configurations 72 having opposed substantially straight sides 73 and rounded ends 74. The grid 70 functions in the same manner described above relative to the grid 24 to bond a plurality of screens into an undulating shape consisting of ridges and grooves. The grid 70 is oriented so that the minor axis 75 of each ellipse-like configuration lies along the peak R of each ridge 31, and each side 73 not only extends substantially perpendicularly to the peak R of the ridge, such as 31, but also has substantially equal halves 77 on opposite sides of the peak R which is coextensive with the minor axis 75 of each ellipse-like configuration 72. In addition, the midpoints of each of the elongated sides 73 of adjacent rows are connected to each other by plastic strips 79 which also lie along the peaks R of the ridges of the undulating shape. The curved ends 74 of adjacent ellipse-like configurations 71 are fused to each other at 80 and these fused portions lie in the troughs T. As can be seen from FIG. 6, there are spaces 81 between grid portions 80 along troughs T so that there can be no puddling of material in the troughs 32.

Another embodiment of a grid 85 is disclosed in FIG. 7 wherein it consists of a pattern of shapes 87 each of which has substantially straight sides 89 and curved ends 90. The straight sides 89 extend substantially perpendicularly to the peaks R of the ridges and substantially equal portions of straight sides 89 lie on opposite sides of each peak R. Furthermore, the side R extends through a major portion of the sides 54 of each ridge. Essentially the sides 90 are part of a curved strip 91 which approximates a sinusoidal shape which criss-crosses across each trough T at points 92 so that portions 93 of each trough are unobstructed by the sinusoidal strip of plastic 91. Thus, the configurations 87 include portions which extend substantially perpendicularly to the major portions of the ridges and include portions which are spaced along the troughs to leave portions of the troughs unobstructed.

A screen which has been made had the following dimensions: The plate 11 had the dimensions set forth above relative to FIGS. 1–3. The base screen 27 was 12 mesh, the intermediate screen 29 was 130 mesh and the uppermost screen 30 was 160 mesh. The undulating screen had a dimension of 1.8 inches between cycles, that is 1.8 inches between adjacent crests and 1.8 inches between the bottoms of adjacent troughs. Also, the radius at the bottoms of the troughs was 0.38 inches and the radius at the crests or peaks was 0.25 inches. The height of the ridges from plate 11 to the tops of the ridges was 0.8 inches. It will be appreciated that the curvature may be of any desired dimension which will provide the proper results.

The screen assemblies described above can be utilized for dry screening, or can be utilized for wet screening of drilling mud which is a slurry of mud and water, and it can also be utilized for other liquid suspensions, such as kaolin and water. A machine of the type which performs a wet screening operation is disclosed in U.S. Pat. No. 4,882,054.

While the foregoing description has shown two fine screening screens bonded to a coarse screen, it will be appreciated that the wrinkle-free construction also is obtained when a single fine screen is bonded to a coarse supporting screen in the above-described manner.

The improved screen assembly 10 of the present invention, in addition to having all of the advantages enumerated above, also has all of the advantages of the screen assemblies disclosed in U.S. Pat. No. 5,417,859, which is incorporated herein by reference.

While preferred embodiments of the present invention have been disclosed, it will be appreciated that the present invention is not limited thereto but may be otherwise embodied within the scope of the following claims.

What is claimed is:

1. A screening screen assembly for a vibratory screening machine comprising an apertured frame, an undulating subassembly of a support screen and a fine screening screen having ridges and troughs, peaks on said ridges, sides on said ridges between said peaks and said troughs, a fused plastic grid bonding said fine screening screen to said support screen at spaced locations while leaving unobstructed portions of said screens therebetween, undersides on said troughs bonded to said apertured frame, said fused plastic grid including first portions extending substantially perpendicularly to the length dimension of said ridges through said peaks and throughout the major portion of said sides of said ridges, and said fused plastic grid also including second portions which extend transversely of said first portions and extend through spaced portions of said troughs while leaving unobstructed portions of said troughs therebetween.

2. A screening screen assembly as set forth in claim 1 wherein said frame is a substantially planar apertured plate, and including means on said apertured plate for securing said apertured plate to the vibratory screening machine.

3. A screening screen assembly as set forth in claim 2 wherein said unobstructed portions of said grid have a substantially hexagonal configuration.

4. A screening screen assembly as set forth in claim 2 herein said unobstructed portions of said grid have a configuration of spaced rows of ellipse-like shapes with substantially straight sides and rounded ends with said substantially straight sides extending substantially perpendicularly to said ridges with the ellipse-like shapes of each row having their minor axes located substantially at the peak of each ridge and their rounded ends secured to each other substantially in said troughs on the opposite sides of each of said peaks, and said rows of ellipse-like shapes being connected to each other by strips which extend along said peaks of said ridges substantially between the midpoints of said sides of said ellipse-like shapes.

5. A screening screen assembly as set forth in claim 2 wherein said grid comprises spaced strips of plastic extending substantially perpendicularly across the peaks of said ridges toward said troughs and terminating at curved lines of plastic extending lengthwise of and crossing said troughs at spaced locations.

6. A screening screen assembly as set forth in claim 1 wherein said unobstructed portions of said grid have a substantially hexagonal configuration.

7. A screening screen assembly as set forth in claim 1 herein said unobstructed portions of said grid have a configuration of spaced rows of ellipse-like shapes with substantially straight sides and rounded ends with said substantially straight sides extending substantially perpendicularly to said ridges with the ellipse-like shapes of each row having their minor axes located substantially at the peak of each ridge and their rounded ends secured to each other substantially in said troughs on the opposite sides of each of said peaks, and said rows of ellipse-like shapes being connected to each other by strips which extend along said peaks of said ridges substantially between the midpoints of said sides of said ellipse-like shapes.

8. A screening screen assembly as set forth in claim 1 wherein said grid comprises spaced strips of plastic extending substantially perpendicularly across the peaks of said ridges toward said troughs and terminating at curved lines of plastic extending lengthwise of and crossing said troughs at spaced locations.

\* \* \* \* \*